United States Patent
Mazzarese et al.

(10) Patent No.: US 9,084,289 B2
(45) Date of Patent: Jul. 14, 2015

(54) METHOD OF PROCESSING REFERENCE SIGNAL CONFIGURATION INFORMATION IN WIRELESS COMMUNICATION SYSTEM, BASE STATION AND TERMINAL

(71) Applicant: Huawei Technologies Co., Ltd., Shenzhen, Guangdong (CN)

(72) Inventors: David Mazzarese, Shenzhen (CN); Yongxing Zhou, Shenzhen (CN); Liang Xia, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/954,666

(22) Filed: Jul. 30, 2013

(65) Prior Publication Data

US 2013/0316719 A1 Nov. 28, 2013

Related U.S. Application Data

(63) Continuation of application No. PCT/CN2012/070758, filed on Jan. 30, 2012.

(30) Foreign Application Priority Data

Jan. 30, 2011 (CN) .......................... 2011 1 0033153

(51) Int. Cl.
*H04W 88/08* (2009.01)
*H04L 1/00* (2006.01)
(Continued)

(52) U.S. Cl.
CPC ............. *H04W 88/08* (2013.01); *H04B 7/0684* (2013.01); *H04L 1/0026* (2013.01);
(Continued)

(58) Field of Classification Search
USPC ............... 455/450, 517, 524, 562.1; 370/260, 370/329, 334
See application file for complete search history.

(56) References Cited

U.S. PATENT DOCUMENTS

| | | | |
|---|---|---|---|
| 2012/0113852 A1 | 5/2012 | Xu et al. | |
| 2013/0028134 A1 | 1/2013 | Wang et al. | |
| 2014/0010181 A1 | 1/2014 | Zhang et al. | |

FOREIGN PATENT DOCUMENTS

| | | |
|---|---|---|
| CN | 101677306 A | 3/2010 |
| CN | 101827444 A | 9/2010 |

(Continued)

OTHER PUBLICATIONS

"3GPP TSG RAN WG1 #62—Signaling for CSI-RS and PDSCH Muting in Rel-10 LTE," Aug. 23-27, 2010, Madrid, Spain, Document R1-104469, Agenda Item 6.3.2.1, 3rd Generation Partnership Project, Valbonne, France.

(Continued)

*Primary Examiner* — Sam Bhattacharya
(74) *Attorney, Agent, or Firm* — Leydig, Voit & Mayer, Ltd.

(57) ABSTRACT

The present invention provides a method of processing reference signal configuration information, a base station and a terminal. The method includes: sending, by a base station, first reference signal configuration information and at least one piece of second reference signal configuration information to a terminal, such that the terminal performs detection of downlink channel state information according to the first reference signal configuration information and the at least one piece of second reference signal configuration information, wherein the first reference signal configuration information includes configuration information of a reference signal sent by antenna port(s) identified by a first number of ports, and the second reference signal configuration information includes configuration information of a reference signal sent by at least one antenna port of other antenna ports than the antenna port(s) identified by the first number of ports among the antenna ports configured by the base station.

19 Claims, 2 Drawing Sheets

--- a base station sends first reference signal configuration information and at least one piece of second reference signal configuration information to a terminal — 101 the terminal performs detection of downlink channel state information according to first reference signal configuration information and at least one piece of second reference signal configuration information — 102

(51) Int. Cl.
*H04L 1/06* (2006.01)
*H04L 5/00* (2006.01)
*H04B 7/06* (2006.01)

(52) U.S. Cl.
CPC ............... *H04L 1/0027* (2013.01); *H04L 1/06* (2013.01); *H04L 5/005* (2013.01); *H04L 5/0023* (2013.01); *H04L 5/0048* (2013.01); *H04L 5/0094* (2013.01); *H04L 5/0053* (2013.01)

(56) References Cited

FOREIGN PATENT DOCUMENTS

| CN | 101888636 A | 11/2010 |
| CN | 101911792 A | 12/2010 |
| JP | 11261387 A | 9/1999 |
| WO | WO 2010107216 A2 | 9/2010 |
| WO | WO 2010110576 A2 | 9/2010 |

OTHER PUBLICATIONS

"3GPP TSG RAN WG1 meeting #62bis—Remaining issues on CSI RS signalling," Oct. 11-15, 2010, Xi'an, China, Document R1-105131, Agenda Item 6.3.1.1, 3$^{rd}$ Generation Partnership Project, Valbonne, France.

"3GPP TSG RAN WG1 meeting #63bis—Discussion on PRS transmission collision with CSI-RS," Jan. 17-21, 2011, Dublin, Ireland, Document R1-110429, Agenda Item 6.2.2.1, 3$^{rd}$ Generation Partnership Project, Valbonne, France.

METHOD OF PROCESSING REFERENCE SIGNAL CONFIGURATION INFORMATION IN WIRELESS COMMUNICATION SYSTEM, BASE STATION AND TERMINAL

CROSS-REFERENCE TO RELATED APPLICATIONS

This application is a continuation of International Patent Application No. PCT/CN2012/070758, filed on Jan. 30, 2012, which claims the priority to Chinese Patent Application No. 201110033153.2, filed on Jan. 30, 2011, both of which are hereby incorporated by reference in their entireties.

TECHNICAL FIELD

The present invention relates to communication technologies, and more particularly, to a method of processing reference signal configuration information in a wireless communication system, a base station and a terminal.

BACKGROUND

In a wireless communication system, in order to enable a terminal to measure downlink channel state information (Channel State Information, CSI for short), a base station needs to send a certain reference signal (Reference Signal, RS for short) to a terminal within a coverage area of the base station for measuring the downlink channel state information. At this moment, the base station needs to send reference signal configuration information which identifies the reference signal to the terminal, such that the terminal is able to detect the downlink channel state information according to the reference signal. In the prior art, a base station may include multiple transmission points (Transmission Point, TP for short), each of which may be configured with multiple antenna ports. Reference signal configuration information is sent through an antenna port to a terminal.

In the prior art, a base station can only send a terminal configuration information of a reference signal which is sent by antenna port(s) identified by a designated number of ports (Number of ports, for example, 1, 2, 4 or 8). That is to say, the base station can only configure a designated number of ports, thereby lowering the flexibility and efficiency of the configuration of antenna ports of the base station.

SUMMARY

A method of processing reference signal configuration information in a wireless communication system, a base station and a terminal are provided by embodiments of the present invention, so as to improve the flexibility and efficiency of the configuration of antenna ports of a base station.

In one aspect, the present invention provides a method of processing reference signal configuration information in a wireless communication system. The wireless communication system includes at least one base station. Each base station includes at least one transmission point, each of which is configured with at least one antenna port. The method includes:

sending, by a base station, first reference signal configuration information and at least one piece of second reference signal configuration information to a terminal, such that the terminal performs detection of downlink channel state information according to the first reference signal configuration information and the at least one piece of second reference signal configuration information, wherein the first reference signal configuration information includes configuration information of a reference signal sent by antenna port(s) identified by a first number of ports, and the second reference signal configuration information includes configuration information of a reference signal sent by at least one antenna port of other antenna ports than the antenna port(s) identified by the first number of ports among the antenna ports configured by the base station, wherein the first number of ports is a pre-set number of ports.

In another aspect, the present invention provides another method of processing reference signal configuration information in a wireless communication system, including:

receiving, by a terminal, first reference signal configuration information and at least one piece of second reference signal configuration information sent by a base station; and performing, by the terminal, detection of downlink channel state information according to the first reference signal configuration information and the at least one piece of second reference signal configuration information, wherein the first reference signal configuration information includes configuration information of a reference signal sent by antenna port(s) identified by a first number of ports, and the second reference signal configuration information includes configuration information of a reference signal sent by at least one antenna port of other antenna ports than the antenna port(s) identified by the first number of ports among the antenna ports configured by the base station, wherein the first number of ports is a pre-set number of ports.

In another aspect, the present invention further provides a base station. The base station includes at least one transmission point, each of which is configured with at least one antenna port. The base station includes:

a sending module, for sending first reference signal configuration information and at least one piece of second reference signal configuration information to a terminal, such that the terminal performs detection of downlink channel state information according to the first reference signal configuration information and the at least one piece of second reference signal configuration information, wherein the first reference signal configuration information includes configuration information of a reference signal sent by antenna port(s) identified by a first number of ports, and the second reference signal configuration information includes configuration information of a reference signal sent by at least one antenna port of other antenna ports than the antenna port(s) identified by the first number of ports among the antenna ports configured by the base station, wherein the first number of ports is a pre-set number of ports.

In another aspect, the present invention further provides a terminal, including:

a receiving module, configured to receive first reference signal configuration information and at least one piece of second reference signal configuration information sent by a base station; and a detecting module, configured to perform detection of downlink channel state information according to the first reference signal configuration information and the at least one piece of second reference signal configuration information, wherein the first reference signal configuration information includes configuration information of a reference signal sent by antenna port(s) identified by a first number of ports, and the second reference signal configuration information includes configuration information of a reference signal sent by at least one antenna port of other antenna ports than the antenna port(s) identified by the first number of ports among the antenna ports configured by the base station, wherein the first number of ports is a pre-set number of ports.

From the above-mentioned technical solutions, it is known that a base station in the embodiments of the present invention can send configuration information of a reference signal sent by any number of ports to a terminal. That is to say, the base station can configure any number of ports, thereby improving the flexibility and efficiency of the configuration of antenna ports of the base station.

BRIEF DESCRIPTION OF DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings can be obtained by the persons of ordinary skill in the art without any creative effort.

DESCRIPTION OF EMBODIMENTS

In order to make objectives, technical solutions and merits of the embodiments of the present invention more clearly, a clear and complete description of the technical solutions of the embodiments of the present invention is given below. Apparently, the described embodiments are part, but not all, of the embodiments of the present invention. All the other embodiments obtained by those of ordinary skill in the art without any creative effort are under the protection scope of the present invention.

A transmission point of the embodiments of the present invention may be a remote radio head (Remote Radio Head, RRH for short), a radio remote unit (Radio Remote Unit, RRU for short), or an antenna unit (Antenna Unit, AU for short). The embodiments of the present invention set no limitation on the transmission point.

Figure 1:
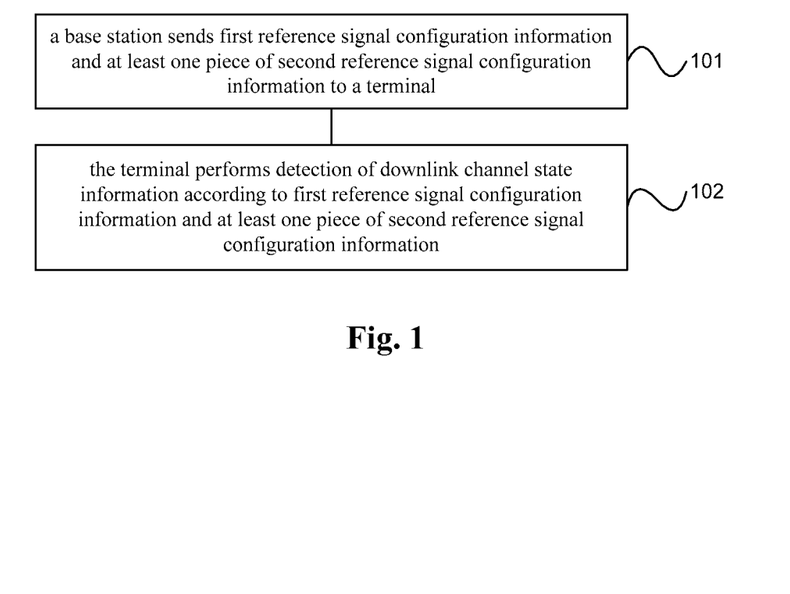
FIG. 1 is a schematic flowchart of a method of processing reference signal configuration information in a wireless communication system provided by a first embodiment of the present invention.

FIG. 1 is a schematic flowchart of a method of processing reference signal configuration information in a wireless communication system provided by a first embodiment of the present invention. In the present embodiment, the wireless communication system may include at least one base station. Each base station includes at least one transmission point, each of which is configured with at least one antenna port. As shown in FIG. 1, in the wireless communication system of present the embodiment, the method of processing the reference signal configuration information may include the following steps.

Step 101: a base station sends first reference signal configuration information and at least one piece of second reference signal configuration information to a terminal.

Step 102: the terminal performs detection of downlink channel state information according to the first reference signal configuration information and the at least one piece of second reference signal configuration information.

The first reference signal configuration information may include configuration information of a reference signal sent by antenna port(s) identified by a first number of ports. The first number of ports is a pre-set number of ports (for example, 1, 2, 4, or 8). Accordingly, the second reference signal configuration information may include configuration information of a reference signal sent by at least one antenna port of other antenna ports than the antenna port(s) identified by the first number of ports among the antenna ports configured by the base station.

Specifically, the first reference signal configuration information may include the first number of ports, a pilot pattern (RS configuration or RS Pattern) of a first reference signal sent by the antenna port(s) identified by the first number of ports, a period (Subframe configuration period) of the first reference signal and a subframe offset (Subframe offset) of the first reference signal.

Specifically, the second reference signal configuration information may include at least one piece of the following information:

a second number of ports, wherein a pilot pattern of a second reference signal sent by antenna port(s) identified by the second number of ports is the same as the pilot pattern of the first reference signal, a period of the second reference signal is the same as the period of the first reference signal, and a subframe offset of the second reference signal is the same as the subframe offset of the first reference signal, wherein the second number of ports is a pre-set number of ports (for example, 1, 2, 4 or 8);

a third number of ports and a pilot pattern of a third reference signal sent by antenna port(s) identified by the third number of ports, wherein a period of the third reference signal is the same as the period of the first reference signal, a subframe offset of the third reference signal is the same as the subframe offset of the first reference signal, and the third number of ports is a pre-set number of ports (for example, 1, 2, 4 or 8);

a fourth number of ports, a pilot pattern of a fourth reference signal sent by antenna port(s) identified by the fourth number of ports, a period of the fourth reference signal and a subframe offset of the fourth reference signal, wherein the fourth number of ports is a pre-set number of ports (for example, 1, 2, 4 or 8);

a fifth number of ports, a period of a fifth reference signal sent by antenna port(s) identified by the fifth number of ports, and a subframe of the fifth reference signal, wherein a pilot pattern of the fifth reference signal is the same as the pilot pattern of the first reference signal, and the fifth number of ports is a pre-set number of ports (for example, 1, 2, 4 or 8);

a pilot pattern of a sixth reference signal, wherein a sixth number of ports corresponding to the sixth reference signal is the same as the first number of ports, a period of the sixth reference signal is the same as the period of the first reference signal, and a subframe offset of the sixth reference signal is the same as the subframe offset of the first reference signal;

a pilot pattern of a seventh reference signal, a period of the seventh reference signal and a subframe offset of the seventh reference signal, wherein a seventh number of ports corresponding to the seventh reference signal is the same as the first number of ports;

a period of an eighth reference signal and a subframe offset of the eighth reference signal, wherein an eighth number of ports corresponding to the eighth reference signal is the same as the first number of ports, and a pilot pattern of the eighth reference signal is the same as the pilot pattern of the first reference signal;

first position information of a ninth reference signal, wherein a period of the ninth reference signal is the same as the period of the first reference signal, and a subframe offset of the ninth reference signal is the same as the subframe offset of the first reference signal;

second position information of a tenth reference signal, a period of the tenth reference signal and a subframe offset of the tenth reference signal; and zero-power reference signal configuration information (similar to reference signal configuration information for identifying a muted data position, which is sent from a base station to a terminal).

The zero-power reference signal configuration information includes at least one piece of the following information:

third position information of an eleventh reference signal, wherein a period of the eleventh reference signal is the same as the period of the first reference signal, and a subframe offset of the eleventh reference signal is the same as the subframe offset of the first reference signal; and fourth position information of a twelfth reference signal, a period of the twelfth reference signal and a subframe offset of the twelfth reference signal.

It should be noted that, in the case that same information exists in configuration information of reference signal(s) sent by at least one antenna port of other antenna ports than the antenna port(s) identified by the first number of ports among the antenna ports configured by the base station (i.e. configurations of antenna ports of a transmission point are the same), the second reference signal configuration information in the present embodiment may include one same piece of information in the above-mentioned multiple pieces of information, or may only include one same piece of information in the above-mentioned one piece of information.

It should be appreciated by those skilled in the art that, regarding a zero-power reference signal configuration information in an embodiment of the present invention, it can be understood in the following way. For antenna ports of some transmission points of a base station, the base station may adopt data muting processing performed for a position where a strong interference cell sends a reference signal, and require a terminal in a coverage area of the base station to perform data muting processing at a position where the antenna port sends a reference signal, such that the terminal performs rate matching according to the muted data position.

Specifically, the first position information, the second position information, the third position information or the fourth position information may be a 16-bit bitmap code based on a pilot pattern of a reference signal of 4 antenna ports (a bit corresponding to a pilot pattern of a zero-power reference signal or to that of a non-zero power reference signal is set to 1), which is compatible with an existing signalling format; or may be a 32-bit bitmap code based on a pilot pattern of a reference signal of 2 antenna ports (a bit corresponding to a pilot pattern of a zero-power reference signal or to that of a non-zero power reference signal is set to 1), which is more flexible to indicate a position of a reference signal; or may be an 8-bit bitmap code based on a pilot pattern of a reference signal of 8 antenna ports (a bit corresponding to a pilot pattern of a zero-power reference signal or to that of a non-zero power reference signal is set to 1), which can reduce the overhead of a system. Alternatively, the first position information or the second position information may adopt a shortened 8-bit bitmap code or a shortened 16-bit bitmap code or a shortened 32-bit bitmap code, which means a length of the bitmap code is longer than or equal to the number of 1 in the 32-bit bitmap code, the 16-bit bitmap code or the 8-bit bitmap code of the third position information or the fourth position information, thereby further reducing the overhead of system. The embodiments of the present invention shall not be limited.

In the present embodiment, there are 156 possible configurations of a subframe offset of a reference signal and a period of the reference signal, which are indicated by an 8-bit code.

It should be noted that, in the present embodiment, antenna port serial numbers, which correspond to non-zero power reference signals identified by the first reference signal configuration information and by the second reference signal configuration information, may be determined by at least one of the following manners.

A rule for determining a port serial number in a pre-defined manner is that, for example: a non-zero power reference signal, which corresponds to a period-subframe offset configuration having the lowest number and to the lowest bit position for indicating a non-zero power reference signal of a bitmap code in the position information, has the lowest port serial number, and then, a port serial number of a corresponding non-zero power reference signal increases accordingly along with increase of port serial number of a period-subframe offset configuration and/or with increase of a bit position for indicating a non-zero power reference signal in the bitmap code; or a non-zero power reference signal which is notified firstly has the lowest port serial number, and then the port serial number of the non-zero power reference increases one by one; or a port, which corresponds to a non-zero power reference signal identified by the first reference signal configuration information, has the lowest port serial number, and then a port serial number of a port corresponding to a non-zero power reference signal identified by the second reference signal configuration information increases one by one.

Additional information is added in the first reference signal configuration information and/or the second reference signal configuration information to indicate a port serial number corresponding to a non-zero power reference signal identified by reference signal configuration information. For example, the additional information is a sequence number assigned by a network side for the first reference signal configuration information and/or the second reference signal configuration information. A non-zero power reference signal, which is identified by reference signal configuration information with a lower sequence number, corresponds to a lower port serial number.

Specifically, it is supposed that the first reference signal configuration information indicates a non-zero power reference signal of 4 ports, and the second reference signal configuration information includes two numbers of different period-subframe offset configurations ($I_1$, $I_2$), which respectively indicate two different periods-subframe offsets. Each period-subframe offset respectively corresponds to first position information or second position information ($B_1$, $B_2$), wherein $B_1$ represents first position information or second position information corresponding to a $i^{th}$ period-subframe offset. The first position information or the second position information is a 16-bit bitmap code based on a pilot pattern of a reference signal of 4 antenna ports (a bit corresponding to a pilot pattern of a non-zero power reference signal is set to 1). Specifically, it is supposed that $I_1=10$, $I_2=3$, $B_1$="0101000000000000", and $B_2$="1100000000000000". Since $I_2<I_1$, port serial numbers, which correspond to non-zero power reference signals indicated by the first reference signal configuration information and the second reference signal configuration information, are N, N+1, ..., and N+19, where N is an initial value of the port serial numbers, wherein four ports identified by the port serial numbers N, N+1, N+2 and N+3 respectively correspond to four ports indicated by the first reference signal configuration information, four ports identified by the port serial numbers N+4, N+5, N+6 and N+7 respectively correspond to four ports indicated by the first "1" in $B_2$, four ports identified by the port serial numbers N+8, N+9, N+10 and N+11 respectively correspond to four ports indicated by the second "1" in $B_2$, four ports identified by the port serial numbers N+12, N+13, N+14 and N+15 respectively correspond to four ports indicated by the first "1" in $B_1$, and four ports identified by the port serial numbers N+16, N+17, N+18 and N+19 respectively correspond to four ports indicated by the second "1" in $B_1$. Or, since $I_1$ and $B_1$ are notified firstly, and $I_2$ and $B_2$ are notified secondly, port serial numbers, which correspond to non-zero power reference signals indicated by the first reference signal configuration information and the second reference signal configuration information, are N, N+1, ..., and N+19, where N is an initial value of the port serial numbers, wherein four ports identified by the port serial numbers N, N+1, N+2 and N+3 respectively correspond to four ports indicated by the first reference signal configuration information, four ports identified by the port serial numbers N+4, N+5, N+6 and N+7 respectively correspond to four ports indicated by the first "1" in $B_1$, four ports identified by N+8, N+9, N+10 and N+11 respectively correspond to four ports indicated by the second "1" in $B_1$, four ports identified by N+12, N+13, N+14 and N+15 respectively correspond to four ports indicated by the first "1" in $B_2$, and four ports identified by N+16, N+17, N+18 and N+19 respectively correspond to four ports indicated by the second "1" in $B_2$. Specifically, it is supposed that a non-zero power reference signal ($P_1$) of 4 ports is indicated by the first reference signal configuration information, and two non-zero power reference signals ($P_2$, $P_3$) of 4 ports are indicated by the second reference signal configuration information. If configuration information corresponding to $P_1$ is notified firstly, and configuration information corresponding to $P_2$ and $P_3$ is notified subsequently one by one, port serial numbers corresponding to non-zero power reference signals indicated by the first reference signal configuration information and the second reference signal configuration information are N, N+1, ..., and N+11, where N is an initial value of the port serial numbers, wherein four ports identified by the port serial numbers N, N+1, N+2 and N+3 respectively correspond to four ports of $P_1$, four ports identified by the port serial numbers N+4, N+5, N+6 and N+7 respectively correspond to four ports of $P_2$, and four ports identified by N+8, N+9, N+10 and N+11 respectively correspond to four ports of $P_3$. Or, if additional information is added in the first reference signal configuration information and the second reference signal configuration information to indicate a port serial number corresponding to a non-zero power reference signal identified by reference signal configuration information, for example, the additional information includes sequence number 1 corresponding to $P_1$, sequence number 3 corresponding to $P_2$, and sequence number 2 corresponding to $P_3$, then the port serial numbers corresponding to non-zero power reference signals indicated by the first reference signal configuration information and the second reference signal configuration information are N, N+1, ..., and N+11, where N is an initial value of the port serial numbers, wherein four ports identified by the port serial numbers N, N+1, N+2 and N+3 respectively correspond to four ports of $P_1$, four ports identified by the port serial numbers N+4, N+5, N+6 and N+7 respectively correspond to four ports of $P_3$, and four ports identified by N+8, N+9, N+10 and N+11 respectively correspond to four ports of $P_2$.

Figure 2:
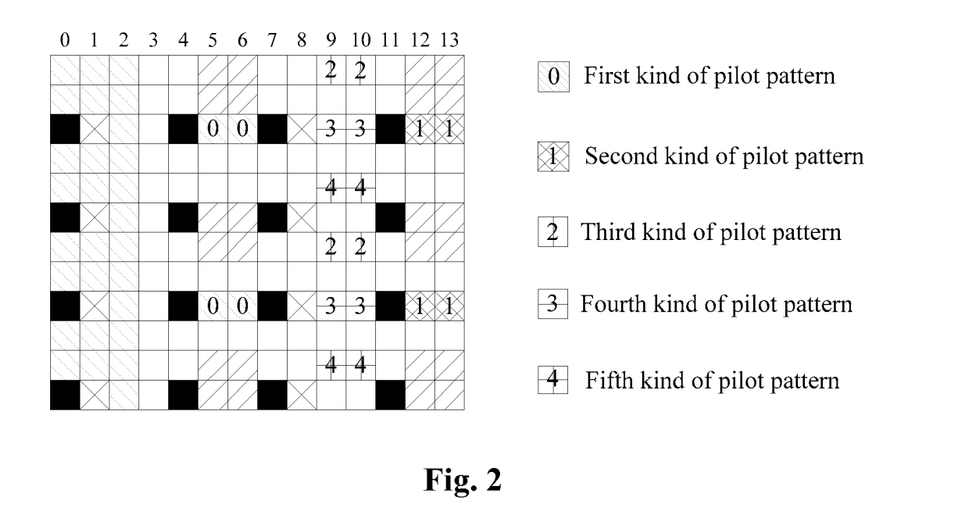
FIG. 2 is a schematic drawing of a pilot pattern provided by the first embodiment of the present invention.

Specifically, as shown in FIG. 2, 5 of 16 kinds of pilot patterns among pilot patterns of reference signals of 4 antenna ports with normal cyclic prefix (normal cyclic prefix) is taken as an example. It is supposed that a pilot pattern of a non-zero power reference signal indicated by the first reference signal configuration information is a first kind of pilot pattern, and first position information or second position information is used by the second reference signal configuration information, wherein the first position information or the second position information is a 16-bit bitmap code based on a pilot pattern of a reference signal of 4 antenna ports (a bit corresponding to a pilot pattern of a non-zero power reference signal is set to 1). A specific 16-bit bitmap code is "0101000000000000", which indicates that pilot patterns of a non-zero power reference signal are a second kind of pilot pattern and a fourth kind of pilot pattern. Then port serial numbers corresponding to non-zero power reference signals indicated by the first reference signal configuration information and the second reference signal configuration information are N, N+1, ..., and N+11, where N is an initial value of the port serial numbers, wherein four ports identified by the port serial numbers N, N+1, N+2 and N+3 respectively correspond to four ports indicated by the first kind of pilot pattern, four ports identified by the port serial numbers N+4, N+5, N+6 and N+7 respectively correspond to four ports identified by the second kind of pilot pattern, and four ports identified by the port serial numbers N+8, N+9, N+10 and N+11 respectively correspond to four ports identified by the fourth kind of pilot pattern.

Supposing that a pilot pattern of a non-zero power reference signal indicated by the first reference signal configuration information is the first kind of pilot pattern, a pilot pattern of a non-zero power reference signal notified firstly by the second reference signal configuration information is the fourth pilot pattern, and a pilot pattern of a non-zero power reference signal notified secondly by the second reference signal configuration information is the second kind of pilot pattern, then port serial numbers corresponding to non-zero power reference signals indicated by the first reference signal configuration information and the second reference signal configuration information are N, N+1, ..., and N+11, where N is an initial value of the port serial numbers, wherein four ports identified by the port serial numbers N, N+1, N+2 and N+3 respectively correspond to four ports identified by the first kind of pilot pattern, four ports identified by the port serial numbers N+4, N+5, N+6 and N+7 respectively correspond to four ports identified by the fourth kind of pilot pattern, and four ports identified by the port serial numbers N+8, N+9, N+10 and N+11 respectively correspond to four ports identified by the second kind of pilot pattern.

A numbering order of the ports identified by each kind of the above-mentioned pilot patterns may be pre-defined, or implemented by referring to the prior art.

Furthermore, the method of processing reference signal configuration information in the wireless communication system of the present embodiment, may further include a step that the base station sends a ratio (Pc) of an energy per resource element (Energy Per Resource Element, EPRE for short) of a physical downlink shared channel (Physical Downlink Shared Channel, PDSCH for short) to $EPRE_1$ of a reference signal identified by the first reference signal configuration information and/or to $EPRE_2$ of a reference signal identified by the second reference signal configuration information, to the terminal, such that the terminal may perform feedback of CSI according to the ratio. The ratio may be represented by the following formulas: $Pc=EPRE_{PDSCH}/EPRE_1$, $Pc=EPRE_{PDSCH}/EPRE_2$, or $Pc=EPRE_{PDSCH}/$ $EPRE_{12}$, wherein the $EPRE_{12}$ may be an EPRE of a reference signal identified by the first reference signal configuration information and a reference signal identified by the second reference signal configuration information.

Specifically, the base station may notify one or multiple Pcs to the terminal. If the base station needs to notify one Pc to the terminal, a value of the Pc may be determined by the base station according to a set of antenna ports which actually transmit data. If the base station needs to notify multiple Pcs to the terminal, a value of each Pc may be determined respectively by the base station according to antenna port(s), corresponding to the first number of ports, the second number of ports, the third number of ports, the fourth number of ports, the fifth number of ports, the sixth number of ports, the seventh number of ports, the eighth number of ports, the first position information or the second position information, that might transmit data.

In the present embodiment, a base station may send configuration information of a reference signal sent by any number of ports to a terminal. That is to say, a base station can configure any number of ports, thereby improving the flexibility and efficiency of configuration of antenna ports of the base station.

The method of data transmission of the present embodiment may be applied to various kinds of radio access networks, for example, to a Universal Mobile Telecommunication System (Universal Mobile Telecommunication System, UMTS for short), an Evolved Universal Mobile Telecommunication System Territorial Radio Access Network (Evolved Universal Mobile Telecommunication System Territorial Radio Access Network, E-UTRAN for short), a UMTS Territorial Radio Access Network (UMTS Territorial Radio Access Network, UTRAN for short) and so on.

A base station in the present embodiment may be a device such as an Evolved NodeB (Evolved NodeB, eNB for short) in the E-UTRAN, a NodeB (NodeB, NB for short) in the UTRAN/GERAN, or the like.

It should be noted that, in order to make the description simple, the preceding respective method embodiments are described as combinations of a series of acts, while it should be known to those skilled in the art that the present invention is not limited by the order of acts, as some steps, according to the present invention, may be executed in other orders or concurrently. In addition, it should be also known to those skilled in the art that the embodiments described in the description are preferable ones, and the involved acts and modules thereof are not necessarily essential in the present invention.

In the embodiments, the descriptions of the respective embodiments have different emphases. The parts which are not described in detail in one embodiment may be referred to relevant description of other embodiments.

Figure 3:
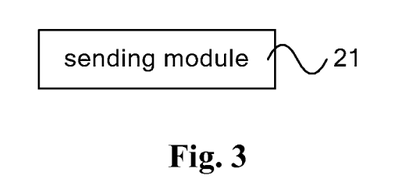
FIG. 3 is a schematic diagram of a structure of a base station provided by a second embodiment of the present invention.

FIG. 3 is a schematic diagram of a structure of a base station provided by a second embodiment of the present invention. The wireless communication system in the present embodiment may include at least one base station. Each base station includes at least one transmission point, each of which is configured with at least one antenna port. The base station of the present embodiment may include a sending module 21, which is used for sending first reference signal configuration information and at least one piece of second reference signal configuration information to a terminal, such that the terminal performs detection of downlink channel state information according to the first reference signal configuration information and the at least one piece of second reference signal configuration information.

The first reference signal configuration information includes configuration information of a reference signal sent by antenna port(s) identified by a first number of ports. The second reference signal configuration information includes configuration information of a reference signal sent by at least one antenna port in other antenna port except antenna port identified by the first number of ports in antenna ports configured by the base station, wherein the first number of ports is a pre-set number of ports.

The functionality of the base station in the first embodiment described above may be accomplished by the base station provided by the embodiment of the present invention.

Specifically, the first reference signal configuration information may include the first number of ports, a pilot pattern of a first reference signal sent by the antenna port(s) identified by the first number of ports, a period of the first reference signal and a subframe offset of the first reference signal.

Specifically, the second reference signal configuration information may include at least one piece of the following information:

a second number of ports, wherein a pilot pattern of a second reference signal sent by antenna port(s) identified by the second number of ports is the same as the pilot pattern of the first reference signal, a period of the second reference signal is the same as the period of the first reference signal, and a subframe offset of the second reference signal is the same as the subframe offset of the first reference signal, wherein the second number of ports is a pre-set number of ports (for example, 1, 2, 4 or 8);

a third number of ports and a pilot pattern of a third reference signal sent by antenna port(s) identified by the third number of ports, wherein a period of the third reference signal is the same as the period of the first reference signal, a subframe offset of the third reference signal is the same as the subframe offset of the first reference signal, and the third number of ports is a pre-set number of ports (for example, 1, 2, 4 or 8);

a fourth number of ports, a pilot pattern of a fourth reference signal sent by antenna port(s) identified by the fourth number of ports, a period of the fourth reference signal and a subframe offset of the fourth reference signal, wherein the fourth number of ports is a pre-set number of ports (for example, 1, 2, 4 or 8);

a fifth number of ports, a period of a fifth reference signal sent by antenna port(s) identified by the fifth number of ports, and a subframe of the fifth reference signal, wherein a pilot pattern of the fifth reference signal is the same as the pilot pattern of the first reference signal, and the fifth number of ports is a pre-set number of ports (for example, 1, 2, 4 or 8);

a pilot pattern of a sixth reference signal, wherein a sixth number of ports corresponding to the sixth reference signal is the same as the first number of ports, a period of the sixth reference signal is the same as the period of the first reference signal, and a subframe offset of the sixth reference signal is the same as the subframe offset of the first reference signal;

a pilot pattern of a seventh reference signal, a period of the seventh reference signal and a subframe offset of the seventh reference signal, wherein a seventh number of ports corresponding to the seventh reference signal is the same as the first number of ports;

a period of an eighth reference signal and a subframe offset of the eighth reference signal, wherein an eighth number of ports corresponding to the eighth reference signal is the same as the first number of ports, and a pilot pattern of the eighth reference signal is the same as the pilot pattern of the first reference signal;

first position information of a ninth reference signal, wherein a period of the ninth reference signal is the same as the period of the first reference signal, and a subframe offset of the ninth reference signal is the same as the subframe offset of the first reference signal;

second position information of a tenth reference signal, a period of the tenth reference signal and a subframe offset of the tenth reference signal; and zero-power reference signal configuration information (similar to reference signal configuration information for identifying a muted data position, which is sent from a base station to a terminal).

The zero-power reference signal configuration information includes at least one piece of the following information:

third position information of an eleventh reference signal, wherein a period of the eleventh reference signal is the same as the period of the first reference signal, and a subframe offset of the eleventh reference signal is the same as the subframe offset of the first reference signal; and fourth position information of a twelfth reference signal, a period of the twelfth reference signal and a subframe offset of the twelfth reference signal.

It should be appreciated by those skilled in the art that, regarding a zero-power reference signal configuration information in an embodiment of the present invention, it can be understood in the following way. For antenna ports of some transmission points of a base station, the base station may adopt data muting processing performed for a position where a strong interference cell sends a reference signal, and require a terminal in a coverage area of the base station to perform data muting processing at a position where the antenna port sends a reference signal, such that the terminal performs rate matching according to the muted data position.

Specifically, the first position information, the second position information, the third position information or the fourth position information may be a 16-bit bitmap code based on a pilot pattern of a reference signal of 4 antenna ports (a bit corresponding to a pilot pattern of a zero-power reference signal or to that of a non-zero power reference signal is set to 1), which is compatible with an existing signalling format; or a 32-bit bitmap code based on a pilot pattern of a reference signal of 2 antenna ports (a bit corresponding to a pilot pattern of a zero-power reference signal or to that of a non-zero power reference signal is set to 1), which is more flexible to indicate a position of a reference signal; or a 8-bit bitmap code based on a pilot pattern of a reference signal of 8 antenna ports (a bit corresponding to a pilot pattern of a zero-power reference signal or to that of a non-zero power reference signal is set to 1), which can reduce the overhead of a system. Alternatively, the first position information or the second position information may adopt a shortened 8-bit bitmap code or a shortened 16-bit bitmap code or a shortened 32-bit bitmap code, which means a length of the bitmap code is longer than or equal to the number of 1 in the 32-bit bitmap code, the 16-bit bitmap code or the 8-bit bitmap code of the third position information or the fourth position information, thereby further reducing the overhead of system. The embodiments of the present invention shall not be limited.

In the present embodiment, there are 156 possible configurations of a subframe offset of a reference signal and a period of the reference signal, which are indicated by an 8-bit code.

Furthermore, the sending module 21 in the present embodiment may be further used for sending a ratio of an EPRE of a PDSCH to an EPRE of a reference signal identified by the first reference signal configuration information and/or to that of a reference signal identified by the second reference signal configuration information, to the terminal, such that the terminal may perform feedback of CSI according to the ratio.

In the present embodiment, a base station may send configuration information of a reference signal sent by any number of ports to a terminal. That is to say, a base station can configure any number of ports, thereby improving the flexibility and efficiency of configuration of antenna ports of the base station.

Figure 4:
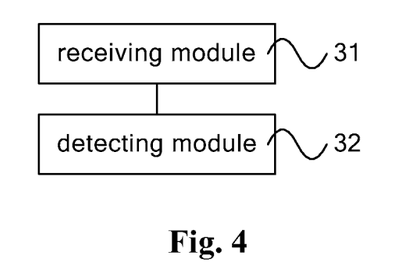
FIG. 4 is a schematic diagram of a structure of a terminal provided by a third embodiment of the present invention.

FIG. 4 is a schematic diagram of a structure of a terminal provided by a third embodiment of the present invention. The wireless communication system in the present embodiment may include at least one base station. Each base station includes at least one transmission point, each of which is configured with at least one antenna port. A terminal in the present embodiment may include a receiving module 31 and a detecting module 32, wherein the receiving module 31 is used for receiving a first reference signal configuration information and at least one piece of second reference signal configuration information sent by a base station, and the detecting module 32 is configured to perform detection of downlink channel state information according to the first reference signal configuration information and the at least one piece of second reference signal configuration information.

The first reference signal configuration information includes configuration information of a reference signal sent by antenna port(s) identified by a first number of ports. The second reference signal configuration information includes configuration information of a reference signal sent by at least one antenna port in other antenna port except antenna port identified by the first number of ports in antenna ports configured by the base station, wherein the first number of ports is a pre-set number of ports.

The functionality of the terminal in the first embodiment described above may be accomplished by the terminal provided by the embodiment of the present invention.

Specifically, the first reference signal configuration information may include the first number of ports, a pilot pattern of a first reference signal sent by the antenna port(s) identified by the first number of ports, a period of the first reference signal and a subframe offset of the first reference signal.

Specifically, the second reference signal configuration information may include at least one piece of the following information:

a second number of ports, wherein a pilot pattern of a second reference signal sent by antenna port(s) identified by the second number of ports is the same as the pilot pattern of the first reference signal, a period of the second reference signal is the same as the period of the first reference signal, and a subframe offset of the second reference signal is the same as the subframe offset of the first reference signal, wherein the second number of ports is a pre-set number of ports (for example, 1, 2, 4 or 8);

a third number of ports and a pilot pattern of a third reference signal sent by antenna port(s) identified by the third number of ports, wherein a period of the third reference signal is the same as the period of the first reference signal, a subframe offset of the third reference signal is the same as the subframe offset of the first reference signal, and the third number of ports is a pre-set number of ports (for example, 1, 2, 4 or 8);

a fourth number of ports, a pilot pattern of a fourth reference signal sent by antenna port(s) identified by the fourth number of ports, a period of the fourth reference signal and a subframe offset of the fourth reference signal, wherein the fourth number of ports is a pre-set number of ports (for example, 1, 2, 4 or 8);

a fifth number of ports, a period of a fifth reference signal sent by antenna port(s) identified by the fifth number of ports, and a subframe of the fifth reference signal, wherein a pilot pattern of the fifth reference signal is the same as the pilot pattern of the first reference signal, and the fifth number of ports is a pre-set number of ports (for example, 1, 2, 4 or 8);

a pilot pattern of a sixth reference signal, wherein a sixth number of ports corresponding to the sixth reference signal is the same as the first number of ports, a period of the sixth reference signal is the same as the period of the first reference signal, and a subframe offset of the sixth reference signal is the same as the subframe offset of the first reference signal;

a pilot pattern of a seventh reference signal, a period of the seventh reference signal and a subframe offset of the seventh reference signal, wherein a seventh number of ports corresponding to the seventh reference signal is the same as the first number of ports;

a period of an eighth reference signal and a subframe offset of the eighth reference signal, wherein an eighth number of ports corresponding to the eighth reference signal is the same as the first number of ports, and a pilot pattern of the eighth reference signal is the same as the pilot pattern of the first reference signal;

first position information of a ninth reference signal, wherein a period of the ninth reference signal is the same as the period of the first reference signal, and a subframe offset of the ninth reference signal is the same as the subframe offset of the first reference signal;

second position information of a tenth reference signal, a period of the tenth reference signal and a subframe offset of the tenth reference signal; and zero-power reference signal configuration information (similar to reference signal configuration information for identifying a muted data position, which is sent from a base station to a terminal).

The zero-power reference signal configuration information includes at least one piece of the following information:

third position information of an eleventh reference signal, wherein a period of the eleventh reference signal is the same as the period of the first reference signal, and a subframe offset of the eleventh reference signal is the same as the subframe offset of the first reference signal; and fourth position information of a twelfth reference signal, a period of the twelfth reference signal and a subframe offset of the twelfth reference signal.

It should be appreciated by those skilled in the art that, regarding a zero-power reference signal configuration information in an embodiment of the present invention, it can be understood in the following way. For antenna ports of some transmission points of a base station, the base station may adopt data muting processing performed for a position where a strong interference cell sends a reference signal, and require a terminal in a coverage area of the base station to perform data muting processing at a position where the antenna port sends a reference signal, such that the terminal performs rate matching according to the muted data position.

Specifically, the first position information, the second position information, the third position information or the fourth position information may be a 16-bit bitmap code based on a pilot pattern of a reference signal of 4 antenna ports (a bit corresponding to a pilot pattern of a zero-power reference signal or to that of a non-zero power reference signal is set to 1), which is compatible with an existing signalling format; or a 32-bit bitmap code based on a pilot pattern of a reference signal of 2 antenna ports (a bit corresponding to a pilot pattern of a zero-power reference signal or to that of a non-zero power reference signal is set to 1), which is more flexible to indicate a position of a reference signal; or a 8-bit bitmap code based on a pilot pattern of a reference signal of 8 antenna ports (a bit corresponding to a pilot pattern of a zero-power reference signal or to that of a non-zero power reference signal is set to 1), which can reduce the overhead of a system. Alternatively, the first position information or the second position information may adopt a shortened 8-bit bitmap code, a shortened 16-bit bitmap code or a shortened 32-bit bitmap code, which means a length of the bitmap code is longer than or equal to the number of 1 in the 32-bit bitmap code, the 16-bit bitmap code or the 8-bit bitmap code of the third position information or the fourth position information, thereby further reducing the overhead of system. The embodiments of the present invention shall not be limited.

In the present embodiment, there are 156 possible configurations of a subframe offset of a reference signal and that of a period of the reference signal, which are indicated by an 8-bit code.

Furthermore, the receiving module 31 in the present embodiment may be further used for receiving a ratio a ratio of an EPRE of a PDSCH to an EPRE of a reference signal identified by the first reference signal configuration information and/or to that of a reference signal identified by the second reference signal configuration information, sent by the base station; and accordingly, the detecting module may perform feedback of CSI according to the ratio received by the receiving module 31.

In the present embodiment, a terminal may receive configuration information of a reference signal sent by any number of ports sent from a base station. That is to say, a base station can configure any number of ports, thereby improving the flexibility and efficiency of configuration of antenna ports of the base station.

It may be referred to 3GPP TS 36.201 and 3GPP TS 36.203 for explanation of parts of the technical terms involved in the above-mentioned embodiments and solutions of the prior art in the background.

It should be appreciated for those of ordinary skill in the art that all or a part of the procedures in the above-mentioned embodiments of the method may be implemented with a program instructing relevant hardware. The preceding program may be stored in a computer readable storage medium. The procedures of the above-mentioned embodiments of the method are included when the program is executed; and the preceding storage medium includes various kinds of medium that can store a program code, such as a ROM, a RAM, a magnetic disk, an optical disk, or the like.

In the end, it should be noted that the foregoing embodiments are only used to illustrate the technical solutions of the present invention rather than limiting the present invention; though the present invention is illustrated in detail by referring to the preceding embodiments, it should be appreciated by those of ordinary skill in the art that modifications may still be made on the technical solutions disclosed in the preceding respective embodiments, or equivalent alterations may be made to a part of technical characteristics thereof; and these modifications or alterations do not make the nature of corresponding technical solutions departure from the spirit and scope of the technical solutions of the respective embodiments of the present invention.

What is claimed is:

1. A method of processing reference signal configuration information in a wireless communication system, the wireless communication system comprising at least one base station, each base station comprising at least one transmission point each configured with at least one antenna port, wherein the method comprises:

sending, by a base station, first reference signal configuration information and second reference signal configuration information to a terminal, such that the terminal performs detection of downlink channel state information according to the first reference signal configuration information and the second reference signal configuration information, wherein the first reference signal configuration information includes configuration information of a reference signal sent by one or more antenna ports identified by a first number of ports, and the second reference signal configuration information includes configuration information of a reference signal sent by at least one antenna port of other antenna ports than the one or more antenna ports identified by the first number of ports among the antenna ports configured by the base station, wherein the first number of ports is a first pre-set number of ports.

2. The method according to claim 1, wherein the first reference signal configuration information comprises the first number of ports, a pilot pattern of a first reference signal sent by the one or more antenna ports identified by the first number of ports, a period of the first reference signal and a subframe offset of the first reference signal.

3. The method according to claim 1, wherein the second reference signal configuration information comprises at least one of the following information:

a second number of ports, wherein a pilot pattern of a second reference signal sent by one or more antenna ports identified by the second number of ports is the same as the pilot pattern of the first reference signal, a period of the second reference signal is the same as the period of the first reference signal, and a subframe offset of the second reference signal is the same as the subframe offset of the first reference signal, wherein the second number of ports is a second pre-set number of ports;

a third number of ports and a pilot pattern of a third reference signal sent by one or more antenna ports identified by the third number of ports, wherein a period of the third reference signal is the same as the period of the first reference signal, a subframe offset of the third reference signal is the same as the subframe offset of the first reference signal, and the third number of ports is a third pre-set number of ports;

a fourth number of ports, a pilot pattern of a fourth reference signal sent by one or more antenna ports identified by the fourth number of ports, a period of the fourth reference signal and a subframe offset of the fourth reference signal, wherein the fourth number of ports is a fourth pre-set number of ports;

a fifth number of ports, a period of a fifth reference signal sent by one or more antenna ports identified by the fifth number of ports, and a subframe of the fifth reference signal, wherein a pilot pattern of the fifth reference signal is the same as the pilot pattern of the first reference signal, and the fifth number of ports is a fifth pre-set number of ports;

a pilot pattern of a sixth reference signal, wherein a sixth number of ports corresponding to the sixth reference signal is the same as the first number of ports, a period of the sixth reference signal is the same as the period of the first reference signal, and a subframe offset of the sixth reference signal is the same as the subframe offset of the first reference signal;

a pilot pattern of a seventh reference signal, a period of the seventh reference signal and a subframe offset of the seventh reference signal, wherein a seventh number of ports corresponding to the seventh reference signal is the same as the first number of ports;

a period of an eighth reference signal and a subframe offset of the eighth reference signal, wherein an eighth number of ports corresponding to the eighth reference signal is the same as the first number of ports, and a pilot pattern of the eighth reference signal is the same as the pilot pattern of the first reference signal;

first position information of a ninth reference signal, wherein a period of the ninth reference signal is the same as the period of the first reference signal, and a subframe offset of the ninth reference signal is the same as the subframe offset of the first reference signal;

second position information of a tenth reference signal, a period of the tenth reference signal and a subframe offset of the tenth reference signal; and zero-power reference signal configuration information, wherein the zero-power reference signal configuration information comprises at least one piece of the following information:

third position information of an eleventh reference signal, wherein a period of the eleventh reference signal is the same as the period of the first reference signal, and a subframe offset of the eleventh reference signal is the same as the subframe offset of the first reference signal; and fourth position information of a twelfth reference signal, a period of the twelfth reference signal and a subframe offset of the twelfth reference signal.

4. The method according to claim 3, wherein the first position information or the second position information comprises at least one of the following information:

a 16-bit bitmap code based on a pilot pattern of a reference signal of 4 antenna ports;

a 32-bit bitmap code based on a pilot pattern of a reference signal of 2 antenna ports;

a 8-bit bitmap code based on a pilot pattern of a reference signal of 8 antenna ports; and a shortened 8-bit bitmap code, a shortened 16-bit bitmap code or a shortened 32-bit bitmap code.

5. The method according to claim 3, wherein the third position information or the fourth position information comprises at least one of the following information:

a 16-bit bitmap code based on a pilot pattern of a reference signal of 4 antenna ports;

a 32-bit bitmap code based on a pilot pattern of a reference signal of 2 antenna ports; and a 8-bit bitmap code based on a pilot pattern of a reference signal of 8 antenna ports.

6. The method according to claim 1, further comprising:
sending, by the base station, a ratio of an energy per resource element (EPRE) of a physical downlink shared channel (PDSCH) to an EPRE of a reference signal identified by the first reference signal configuration information and/or to that of a reference signal identified by the second reference signal configuration information to the terminal.

7. A method of processing reference signal configuration information in a wireless communication system, comprising:

receiving, by a terminal, first reference signal configuration information and second reference signal configuration information sent by a base station; and performing, by the terminal, detection of downlink channel state information according to the first reference signal configuration information and the second reference signal configuration information, wherein the first reference signal configuration information includes configuration information of a reference signal sent by one or more antenna ports identified by a first number of ports, and the second reference signal configuration information includes configuration information of a reference signal sent by at least one antenna port of other antenna ports than the one or more antenna ports identified by the first number of ports among the antenna ports configured by the base station, wherein the first number of ports is a first pre-set number of ports.

8. The method according to claim 7, wherein the second reference signal configuration information comprises at least one of the following information:
   a second number of ports, wherein a pilot pattern of a second reference signal sent by one or more antenna ports identified by the second number of ports is the same as the pilot pattern of the first reference signal, a period of the second reference signal is the same as the period of the first reference signal, and a subframe offset of the second reference signal is the same as the subframe offset of the first reference signal, wherein the second number of ports is a second pre-set number of ports;
   a third number of ports and a pilot pattern of a third reference signal sent by one or more antenna ports identified by the third number of ports, wherein a period of the third reference signal is the same as the period of the first reference signal, a subframe offset of the third reference signal is the same as the subframe offset of the first reference signal, and the third number of ports is a third pre-set number of ports;
   a fourth number of ports, a pilot pattern of a fourth reference signal sent by one or more antenna ports identified by the fourth number of ports, a period of the fourth reference signal and a subframe offset of the fourth reference signal, wherein the fourth number of ports is a fourth pre-set number of ports;
   a fifth number of ports, a period of a fifth reference signal sent by one or more antenna ports identified by the fifth number of ports, and a subframe of the fifth reference signal, wherein a pilot pattern of the fifth reference signal is the same as the pilot pattern of the first reference signal, and the fifth number of ports is a fifth pre-set number of ports;
   a pilot pattern of a sixth reference signal, wherein a sixth number of ports corresponding to the sixth reference signal is the same as the first number of ports, a period of the sixth reference signal is the same as the period of the first reference signal, and a subframe offset of the sixth reference signal is the same as the subframe offset of the first reference signal;
   a pilot pattern of a seventh reference signal, a period of the seventh reference signal and a subframe offset of the seventh reference signal, wherein a seventh number of ports corresponding to the seventh reference signal is the same as the first number of ports;
   a period of an eighth reference signal and a subframe offset of the eighth reference signal, wherein an eighth number of ports corresponding to the eighth reference signal is the same as the first number of ports, and a pilot pattern of the eighth reference signal is the same as the pilot pattern of the first reference signal;
   first position information of a ninth reference signal, wherein a period of the ninth reference signal is the same as the period of the first reference signal, and a subframe offset of the ninth reference signal is the same as the subframe offset of the first reference signal;
   second position information of a tenth reference signal, a period of the tenth reference signal and a subframe offset of the tenth reference signal; and
   zero-power reference signal configuration information, wherein the zero-power reference signal configuration information comprises at least one piece of the following information:
      third position information of an eleventh reference signal, wherein a period of the eleventh reference signal is the same as the period of the first reference signal, and a subframe offset of the eleventh reference signal is the same as the subframe offset of the first reference signal; and
      fourth position information of a twelfth reference signal, a period of the twelfth reference signal and a subframe offset of the twelfth reference signal.

9. The method according to claim 8, wherein the first position information or the second position information comprises at least one of the following information:
   a 16-bit bitmap code based on a pilot pattern of a reference signal of 4 antenna ports;
   a 32-bit bitmap code based on a pilot pattern of a reference signal of 2 antenna ports;
   a 8-bit bitmap code based on a pilot pattern of a reference signal of 8 antenna ports; and
   a shortened 8-bit bitmap code, a shortened 16-bit bitmap code or a shortened 32-bit bitmap code.

10. The method according to claim 8, wherein the third position information or the fourth position information comprises at least one of the following information:
   a 16-bit bitmap code based on a pilot pattern of a reference signal of 4 antenna ports;
   a 32-bit bitmap code based on a pilot pattern of a reference signal of 2 antenna ports; and
   a 8-bit bitmap code based on a pilot pattern of a reference signal of 8 antenna ports.

11. The method according to claim 7, further comprising:
   receiving, by the terminal, a ratio of an energy per resource element (EPRE) of a physical downlink shared channel (PDSCH) to an EPRE of a reference signal identified by the first reference signal configuration information and/or to that of a reference signal identified by the second reference signal configuration information, sent by the base station; and
   performing, by the terminal, feedback of downlink channel state information according to the ratio.

12. A base station, comprising at least one transmission point each configured with at least one antenna port, wherein the base station comprises:
   a sending module, configured to send first reference signal configuration information and second reference signal configuration information to a terminal, such that the terminal performs detection of downlink channel state information according to the first reference signal configuration information and the second reference signal configuration information,
   wherein the first reference signal configuration information includes configuration information of a reference signal sent by one or more antenna ports identified by a first number of ports, and the second reference signal configuration information includes configuration information of a reference signal sent by at least one antenna port of other antenna ports than the one or more antenna ports identified by the first number of ports among the antenna ports configured by the base station, wherein the first number of ports is a first pre-set number of ports.

13. The base station according to claim 12, wherein the first reference signal configuration information comprises the first number of ports, a pilot pattern of a first reference signal sent by the one or more antenna ports identified by the first number of ports, and a period of the first reference signal and a subframe offset of the first reference signal.

14. The base station according to claim 12, wherein the second reference signal configuration information comprises at least one of the following information:
   a second number of ports, wherein a pilot pattern of a second reference signal sent by one or more antenna ports identified by the second number of ports is the same as the pilot pattern of the first reference signal, a period of the second reference signal is the same as the period of the first reference signal, and a subframe offset of the second reference signal is the same as the subframe offset of the first reference signal, wherein the second number of ports is a second pre-set number of ports;
   a third number of ports and a pilot pattern of a third reference signal sent by one or more antenna ports identified by the third number of ports, wherein a period of the third reference signal is the same as the period of the first reference signal, a subframe offset of the third reference signal is the same as the subframe offset of the first reference signal, and the third number of ports is a third pre-set number of ports;
   a fourth number of ports, a pilot pattern of a fourth reference signal sent by one or more antenna ports identified by the fourth number of ports, a period of the fourth reference signal and a subframe offset of the fourth reference signal, wherein the fourth number of ports is a fourth pre-set number of ports;
   a fifth number of ports, a period of a fifth reference signal sent by one or more antenna ports identified by the fifth number of ports, and a subframe of the fifth reference signal, wherein a pilot pattern of the fifth reference signal is the same as the pilot pattern of the first reference signal, and the fifth number of ports is a fifth pre-set number of ports;
   a pilot pattern of a sixth reference signal, wherein a sixth number of ports corresponding to the sixth reference signal is the same as the first number of ports, a period of the sixth reference signal is the same as the period of the first reference signal, and a subframe offset of the sixth reference signal is the same as the subframe offset of the first reference signal;
   a pilot pattern of a seventh reference signal, a period of the seventh reference signal and a subframe offset of the seventh reference signal, wherein a seventh number of ports corresponding to the seventh reference signal is the same as the first number of ports;
   a period of an eighth reference signal and a subframe offset of the eighth reference signal, wherein an eighth number of ports corresponding to the eighth reference signal is the same as the first number of ports, and a pilot pattern of the eighth reference signal is the same as the pilot pattern of the first reference signal;
   first position information of a ninth reference signal, wherein a period of the ninth reference signal is the same as the period of the first reference signal, and a subframe offset of the ninth reference signal is the same as the subframe offset of the first reference signal;
   second position information of a tenth reference signal, a period of the tenth reference signal and a subframe offset of the tenth reference signal; and
   zero-power reference signal configuration information, wherein the zero-power reference signal configuration information comprises at least one piece of the following information:
      third position information of an eleventh reference signal, wherein a period of the eleventh reference signal is the same as the period of the first reference signal, and a subframe offset of the eleventh reference signal is the same as the subframe offset of the first reference signal; and
      fourth position information of a twelfth reference signal, a period of the twelfth reference signal and a subframe offset of the twelfth reference signal.

15. The base station according to claim 14, wherein the first position information or the second position information comprises at least one of the following information:
   a 16-bit bitmap code based on a pilot pattern of a reference signal of 4 antenna ports;
   a 32-bit bitmap code based on a pilot pattern of a reference signal of 2 antenna ports;
   a 8-bit bitmap code based on a pilot pattern of a reference signal of 8 antenna ports; and
   a shortened 8-bit bitmap code, a shortened 16-bit bitmap code or a shortened 32-bit bitmap code.

16. The base station according to claim 14, wherein the third position information or the fourth position information comprises at least one of the following information:
   a 16-bit bitmap code based on a pilot pattern of a reference signal of 4 antenna ports;
   a 32-bit bitmap code based on a pilot pattern of a reference signal of 2 antenna ports; and
   a 8-bit bitmap code based on a pilot pattern of a reference signal of 8 antenna ports.

17. The base station according to any one of claim 12, wherein the sending module is further configured to send a ratio of an energy per resource element (EPRE) of a physical downlink shared channel (PDSCH) to an EPRE of a reference signal identified by the first reference signal configuration information and/or to that of a reference signal identified by the second reference signal configuration information to the terminal.

18. A terminal, comprising:
   a receiving module, configured to receive first reference signal configuration information and second reference signal configuration information sent by a base station;
   a detecting module, configured to perform detection of downlink channel state information according to the first reference signal configuration information and the second reference signal configuration information,
   wherein the first reference signal configuration information includes configuration information of a reference signal sent by one or more antenna ports identified by a first number of ports, and the second reference signal configuration information includes configuration information of a reference signal sent by at least one antenna port of other antenna ports than the one or more antenna ports identified by the first number of ports among the antenna ports configured by the base station, wherein the first number of ports is a first pre-set number of ports.

19. The terminal according to claim 18, wherein the second reference signal configuration information comprises at least one of the following information:
   a second number of ports, wherein a pilot pattern of a second reference signal sent by one or more antenna ports identified by the second number of ports is the same as the pilot pattern of the first reference signal, a period of the second reference signal is the same as the period of the first reference signal, and a subframe offset of the second reference signal is the same as the subframe offset of the first reference signal, wherein the second number of ports is a second pre-set number of ports;

a third number of ports and a pilot pattern of a third reference signal sent by one or more antenna ports identified by the third number of ports, wherein a period of the third reference signal is the same as the period of the first reference signal, a subframe offset of the third reference signal is the same as the subframe offset of the first reference signal, and the third number of ports is a third pre-set number of ports;

a fourth number of ports, a pilot pattern of a fourth reference signal sent by one or more antenna ports identified by the fourth number of ports, a period of the fourth reference signal and a subframe offset of the fourth reference signal, wherein the fourth number of ports is a fourth pre-set number of ports;

a fifth number of ports, a period of a fifth reference signal sent by one or more antenna ports identified by the fifth number of ports, and a subframe of the fifth reference signal, wherein a pilot pattern of the fifth reference signal is the same as the pilot pattern of the first reference signal, and the fifth number of ports is a fifth pre-set number of ports;

a pilot pattern of a sixth reference signal, wherein a sixth number of ports corresponding to the sixth reference signal is the same as the first number of ports, a period of the sixth reference signal is the same as the period of the first reference signal, and a subframe offset of the sixth reference signal is the same as the subframe offset of the first reference signal;

a pilot pattern of a seventh reference signal, a period of the seventh reference signal and a subframe offset of the seventh reference signal, wherein a seventh number of ports corresponding to the seventh reference signal is the same as the first number of ports;

a period of an eighth reference signal and a subframe offset of the eighth reference signal, wherein an eighth number of ports corresponding to the eighth reference signal is the same as the first number of ports, and a pilot pattern of the eighth reference signal is the same as the pilot pattern of the first reference signal;

first position information of a ninth reference signal, wherein a period of the ninth reference signal is the same as the period of the first reference signal, and a subframe offset of the ninth reference signal is the same as the subframe offset of the first reference signal;

second position information of a tenth reference signal, a period of the tenth reference signal and a subframe offset of the tenth reference signal; and zero-power reference signal configuration information, wherein the zero-power reference signal configuration information comprises at least one piece of the following information:
    third position information of an eleventh reference signal, wherein a period of the eleventh reference signal is the same as the period of the first reference signal, and a subframe offset of the eleventh reference signal is the same as the subframe offset of the first reference signal; and
    fourth position information of a twelfth reference signal, a period of the twelfth reference signal and a subframe offset of the twelfth reference signal.

\* \* \* \* \*